(12) United States Patent
Lee

(10) Patent No.: US 8,922,353 B2
(45) Date of Patent: Dec. 30, 2014

(54) REMOTE CONTROL SYSTEM HAVING A COMMUNICATION FREQUENCY LOWER THAN WIRELESS FIDELITY SIGNALS

(71) Applicant: Leadot Innovation, Inc., Kaohsiung (TW)

(72) Inventor: Ti-Tien Lee, Taipei (TW)

(73) Assignee: Leadot Innovation, Inc., Kaohsiung (TW)

( * ) Notice: Subject to any disclaimer, the term of this patent is extended or adjusted under 35 U.S.C. 154(b) by 115 days.

(21) Appl. No.: 13/771,101

(22) Filed: Feb. 20, 2013

(65) Prior Publication Data

US 2014/0176308 A1 Jun. 26, 2014

(30) Foreign Application Priority Data

Dec. 21, 2012 (TW) ................ 101149129 A

(51) Int. Cl.
*G05B 11/01* (2006.01)
*G08C 19/16* (2006.01)
*G08C 17/02* (2006.01)
*H04W 88/14* (2009.01)
*H04W 84/12* (2009.01)
*H04W 92/02* (2009.01)

(52) U.S. Cl.
CPC ............ *G08C 17/02* (2013.01); *H04W 88/14* (2013.01); *H04W 84/12* (2013.01); *H04W 92/02* (2013.01)
USPC ......................................... 340/12.5; 341/176

(58) Field of Classification Search
CPC ......................... G08C 17/02; G07C 9/00309
USPC ..................... 340/12.5; 341/176; 709/218
See application file for complete search history.

(56) References Cited

U.S. PATENT DOCUMENTS

| 8,253,867 | B2 * | 8/2012 | Hornback et al. | ............. 348/734 |
| 8,482,450 | B2 * | 7/2013 | Choi et al. | .................... 341/176 |
| 2007/0120678 | A1 | 5/2007 | Posamentier | |
| 2007/0245019 | A1 * | 10/2007 | Westberg et al. | ............. 709/225 |
| 2010/0271252 | A1 * | 10/2010 | Musschebroeck et al. | ... 341/176 |
| 2011/0090846 | A1 | 4/2011 | Hao | |
| 2012/0315843 | A1 | 12/2012 | Cox | |
| 2013/0201316 | A1 * | 8/2013 | Binder et al. | ................... 348/77 |

FOREIGN PATENT DOCUMENTS

| JP | 200031880 A | 1/2000 |
| TW | 200802117 | 1/2008 |
| TW | 201251357 A1 | 12/2012 |
| TW | M442564 U1 | 12/2012 |

* cited by examiner

*Primary Examiner* — John A Tweel, Jr.
(74) *Attorney, Agent, or Firm* — Winston Hsu; Scott Margo

(57) ABSTRACT

A remote control system includes a control interface, a WiFi router, a bridge, and a low frequency control module. The WiFi router is linked to the control interface for communicating with the control interface via WiFi signals. The bridge is linked to the WiFi router for down-converting WiFi signals outputted from the WiFi router to low frequency signals and up-converting received low frequency signals to WiFi signals. The low frequency control module is linked to the bridge for communicating with the bridge via the low frequency signals.

10 Claims, 3 Drawing Sheets

REMOTE CONTROL SYSTEM HAVING A COMMUNICATION FREQUENCY LOWER THAN WIRELESS FIDELITY SIGNALS

BACKGROUND OF THE INVENTION

1. Field of the Invention

The present invention is related to a remote control system, and more particularly, to a remote control system having a communication frequency lower than WiFi signals.

2. Description of the Prior Art

With the development of wireless network, a variety of smart home appliances that can be controlled via a wireless network are flooding the market. One of the advantages of controlling devices over a wireless network is that multiple devices may be controlled by a single interface. Usually a WiFi or Bluetooth network is used to transmit and receive control signals for controlling smart home appliances. However, because the transmission distance of WiFi or Bluetooth is short (effective transmission distance of WiFi is about one hundred meters, transmission distance of WiFi access point is about thirty meters indoor, and transmission distance of Bluetooth is about ten meters), it is a future tendency to increase transmission distance and reduce the possibility of wireless signals being blocked by indoor partitions in order to control smart home appliances located at farther locations.

SUMMARY OF THE INVENTION

An embodiment of the present invention discloses a remote control system having a communication frequency lower than WiFi signals. The remote control system comprises a control interface, a WiFi router, a bridge, and a low frequency control module. The WiFi router is linked to the control interface for bi-directionally communicating with the control interface via WiFi signals. The bridge is linked to the WiFi router for down-converting the WiFi signals outputted from the WiFi router to low frequency signals and up-converting the low frequency signals to the WiFi signals. The low frequency control module is linked to the bridge for bi-directionally communicating with the bridge via the low frequency signals.

The present invention can down-convert high frequency WiFi signals to low frequency signals for controlling devices of the remote control system. The ideal transmission distance of the low frequency signals can reach one to two kilometers, which is farther than that of WiFi signals or Bluetooth signals. Further the low frequency signals are less prone to be blocked by indoor partitions and cover a larger wireless transmission area, thereby solving disadvantages such as the shorter transmission distance inherent in WiFi signals or Bluetooth signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
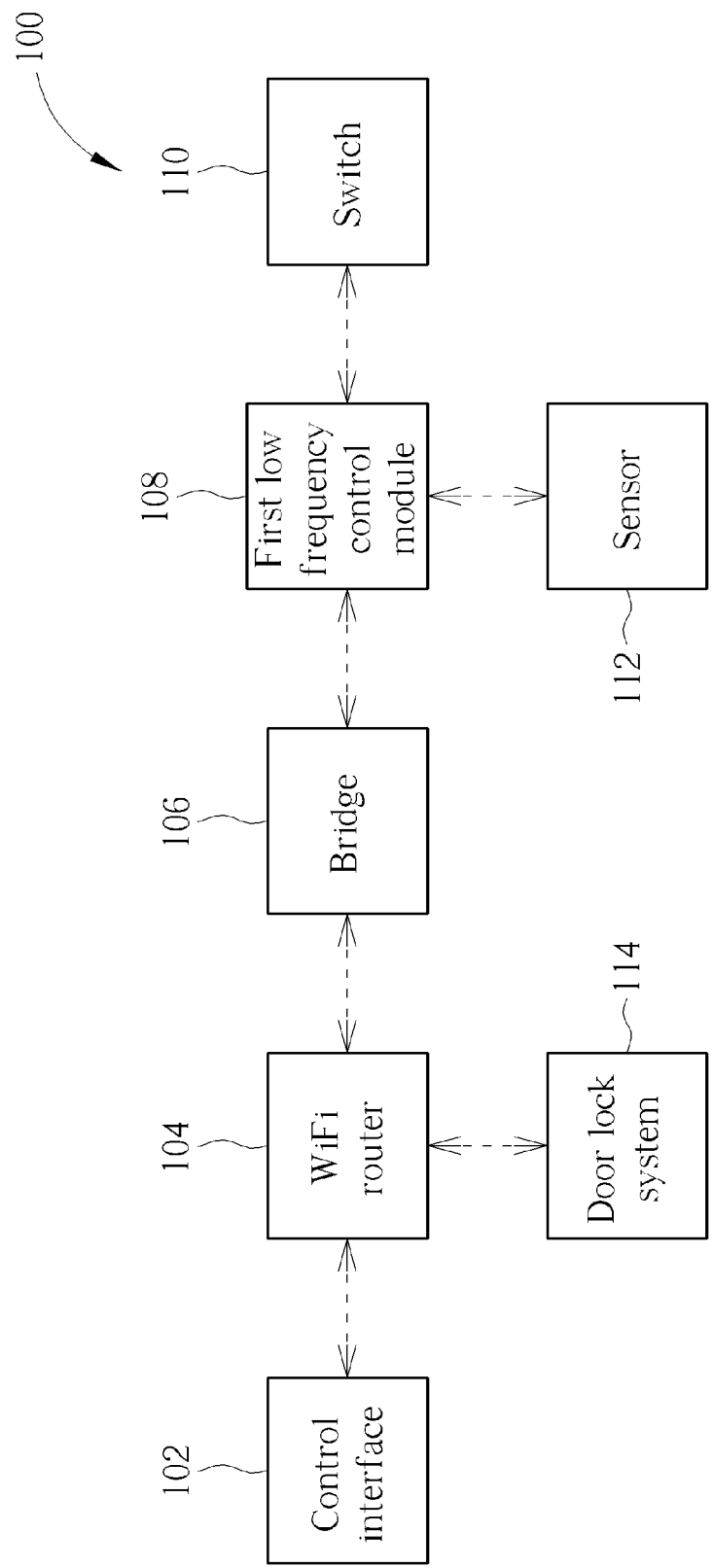
FIG. 1 is a diagram illustrating a remote control system according to an embodiment of the present invention.

Please refer to FIG. 1, which is a diagram illustrating a remote control system 100 according to an embodiment of the present invention. The remote control system 100 may include a control interface 102, a WiFi (wireless fidelity) router 104, a bridge 106, a first low frequency control module 108, a switch 110, a sensor 112, and a door lock system 114. The remote control system 100 may further include at least one power supply for supplying power to a plurality of devices of the remote control system 100. The plurality of devices of the remote control system 100 may be smart home appliances or other electronic devices which can be controlled wirelessly. In an embodiment, the bridge 106 and the first low frequency control module 108 may be disposed in the same housing.

A user may use the control interface 102 to control each device of the remote control system 100 wirelessly. The control interface 102 may be an interface of a portable mobile device such as a smart phone or a tablet, or an interface of a personal computer or an interface of a touch panel. After the user enters control instructions at the control interface 102, the control interface 102 may send out WiFi signals through a wireless network to link to the WiFi router 104 for bi-directionally communicating with the WiFi router 104. Next, the WiFi router 104 sends out the WiFi signals to link to the bridge 106. The bridge 106 may utilize frequency shift keying (FSK) modulation to down-convert the WiFi signals from 2.4 GHz to low frequency signals and link the control instructions entered by the user to the first low frequency control module 108. In this embodiment, the low frequency signals may be 433 MHz, but in other embodiments, the low frequency signals may be other frequencies lower than 2.4 GHz. The first low frequency control module 108 may be a full duplex bi-directional radio frequency (RF) control module which utilizes FSK modulation. The first low frequency control module 108 is configured to send out control instructions entered by the user to a device ready to be controlled via 433 MHz low frequency signals. The first low frequency control module 108 may store parameters set by the user in an internal memory.

The switch 110 is wirelessly linked to the first low frequency control module 108 for bi-directionally communicating with and receiving the low frequency signals from the first frequency control module 108 to control a device by the switch 110 according to the control instructions received by the switch 110. In this embodiment, the switch 110 may be configured to control an LED (light emitting diode) light source and adjust brightness of the LED light source.

The sensor 112 is wirelessly linked to the first low frequency control module 108 for generating a sensing signal according to environmental conditions and transmitting the sensing signal to the first low frequency control module 108. Then the first low frequency control module 108 compares the sensing signal with a control parameter set by the user in advance to control the remote control system 100 according to the control parameter and the sensing signal, that is, a parameter of a device being controlled by the remote control system 100 may be adjusted to the control parameter set by the user. The sensor 112 may be a wireless smoke sensor, a wireless gas sensor, a wireless vibration sensor, and so on. The sensor 112 may be configured to sense environmental temperature, humidity, brightness, smoke, or other conditions. The sensing signal is generated according a sensing result and is transmitted to the first low frequency control module 108. The first low frequency control module 108 may calculate an adjustment amount for performing automatic adjustment according to the sensing signal and the control parameter set by the user or may transmit the adjustment amount to the bridge 106 via the low frequency signals for the bridge 106 to up-convert the low frequency signals to the WiFi signals, then the bridge 106 may send out the WiFi signals back to the control interface 102 for the user to make an adjustment decision. The sensor 112 may be internally equipped with solar panels and batteries for providing power to the sensor 112, or the sensor 112 may be powered by an external power source such as being powered by power over Ethernet (POE) module, which receives power from power source equipment such that the power supplying distance may be extended to be about one hundred meters.

The door lock system 114 is wirelessly linked to the WiFi router 104 for transmitting image signals of monitored areas to the WiFi router 104, then the WiFi router 104 transmits the image signals to the control interface 102 for the user to watch. Due to the image signals containing a large amount of data, the door lock system 114 may transmit the image signals directly via WiFi signals. The door lock system 114 may communicate via a local area network (LAN), telephone (TEL), subscriber identity module (SIM), short message service (SMS), WiFi, internet phone, or another communication method. The compressed format, resolution, video playing speed, and bit rate of the image signals may be determined by parameters of the door lock system 114. For example the compressed format of the image signals may be H.264, MPEG-4, MJPEG, or other types of formats. The resolution of the image signals may be NTSC 720*480, NTSC 352*240, NTSC 176*120, PAL 720*576, PAL 352*288, or PAL 176*144. The maximum video playing speed may be NTSC 720*480@30 Hz or PAL 720*576@25 Hz. The bit rate may be in a range of 16 Kbps to 8 Mbps. Moreover, the user may login to an internet platform of the remote control system 100 or use a dedicated terminal to play and watch the video provided that the user has passed account and password verification. The control interface 102 may be a smart phone which supports a Windows 8, Android, or iOS operating system and the smart phone may be used to remotely play the video. In another embodiment, if the door lock system 114 does not need to transmit the image signals, the door lock system 114 may transmit other signals by the low frequency signals via the first low frequency control module 108 and the bridge 106. The door lock system 114 may have recording function, which may record images of monitored areas. Further the door lock system 114 may have a facial recognition function or an infrared night vision function. The door lock system 114 may support a wireless magnetic sensing alarm or a wireless sound and light alarm. For example, the door lock system 114 may support motion detection and infrared moving detection. The door lock system 114 may support a wireless alarm input for the hand-hold remote controller, door magnetic sensing alarm, smoke alarm, gas alarm, vibration alarm, and so on. The door lock system 114 may support one digital line-in alarm input. Moreover, the door lock system 114 may have the function of sending out alarm signals via a server to activate a defense system. In other words, the door lock system 114 may sent out the alarm signals to the control interface 102 to alert the user according to a trigger signal triggered by movement detected by a passive infrared sensor (PIR) or by any other of the above mentioned alarms. The alarm signals may be stored in a remote server or may be shown by SMS. Similarly, the door lock system 114 may be powered by a POE module.

In another embodiment, the WiFi router 104 may be replaced by a 3G wireless router. The control interface 102 may send out signals via 3G wireless network to link to the 3G wireless router and then to link to the bridge 106, which will then down-convert 3G signals to low frequency signals of 433 MHz in order to remotely control devices of the remote control system 100.

Figure 2:
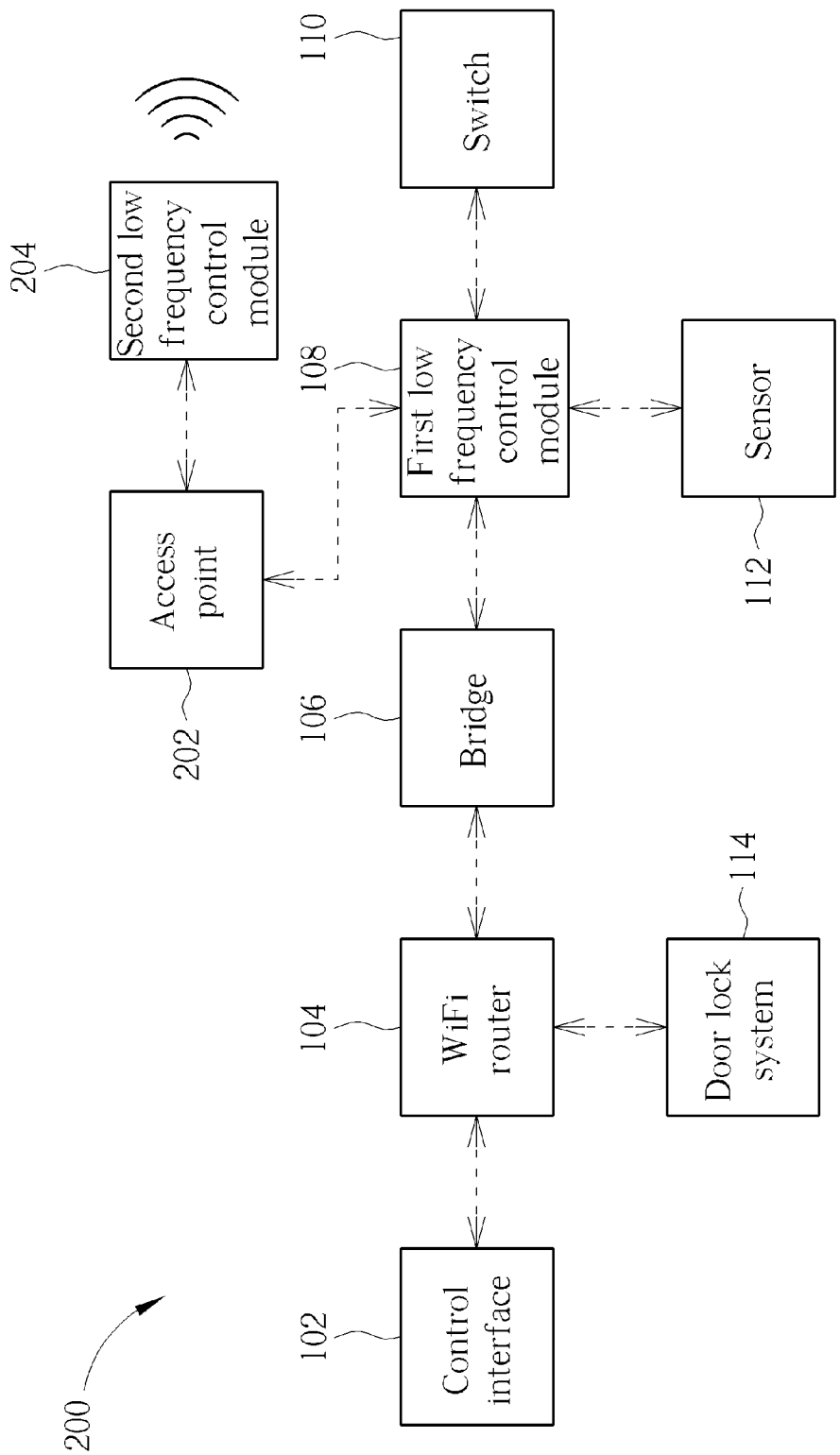
FIG. 2 is a diagram illustrating a remote control system according to another embodiment of the present invention.

Please refer to FIG. 2, which is a diagram illustrating a remote control system 200 according to another embodiment of the present invention. The remote control system 200 includes an access point 202 and a second low frequency control module 204. All other devices of the remote control system 200 are the same as FIG. 1. The second low frequency control module 204 functions in an analogous manner as the first low frequency control module 108 and is configured to transmit 433 MHz low frequency signals. The purpose of including the access point 202 and the second low frequency control module 204 in the remote control system 200 is to extend the distance and number of devices which can be controlled in the remote control system 200. The invention includes but is not limited to one access point. A plurality of access points and a plurality of low frequency control modules may be added to the system in other embodiments.

Figure 3:
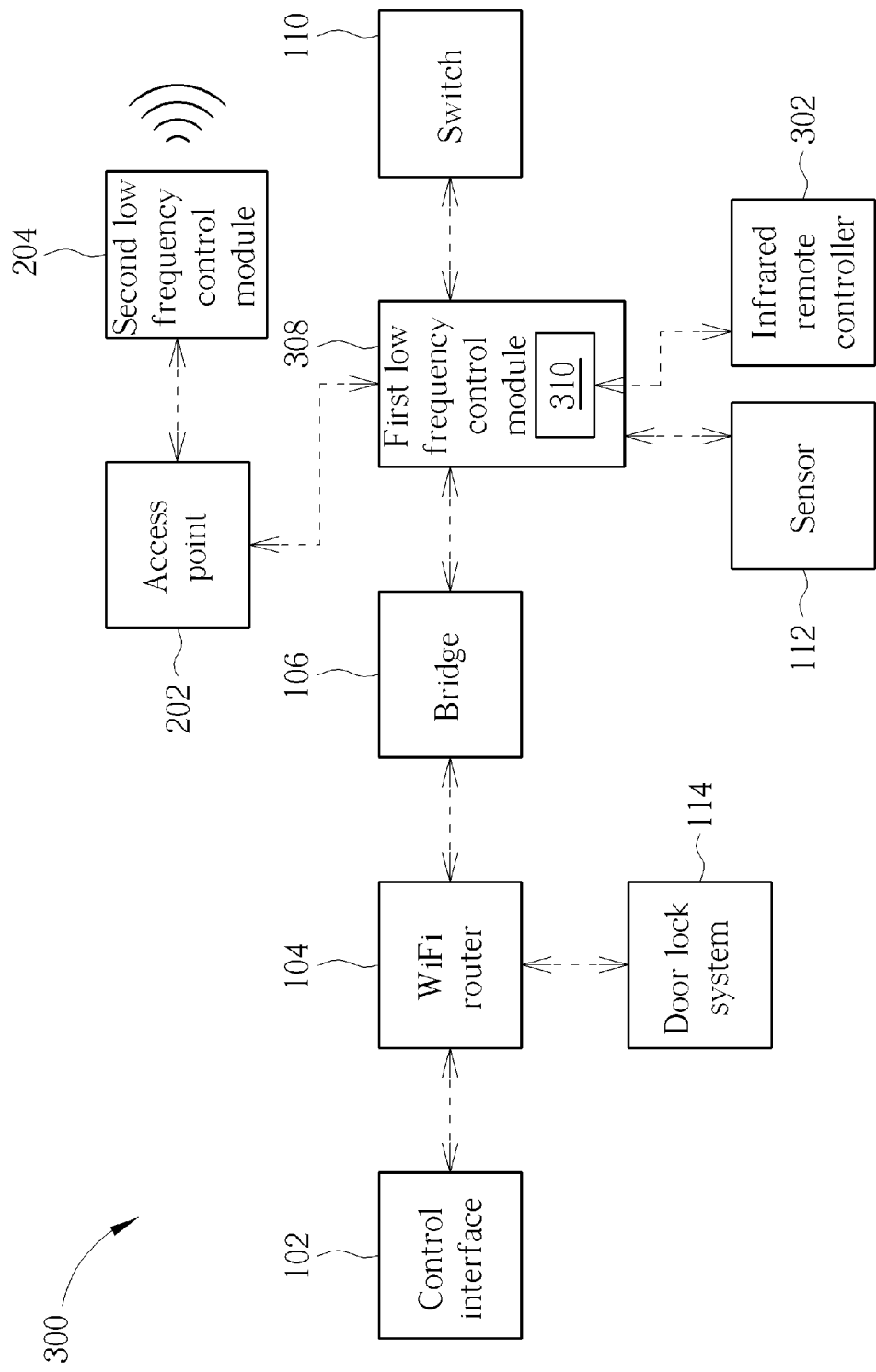
FIG. 3 is a diagram illustrating a remote control system according to another embodiment of the present invention.

Please refer to FIG. 3, which is a diagram illustrating a remote control system 300 according to another embodiment of the present invention. The first low frequency control module 308 of the remote control system 300 further includes an infrared emitter 310. The first low frequency control module 308 may convert the low frequency signals to infrared signals after receiving control instructions of the low frequency signals and transmitting the infrared signals to an infrared remote controller 302 via the infrared emitter 310. Then the infrared remote controller 302 may control a device having an infrared receiver such as a television.

In summary, the present invention can down-convert high frequency WiFi signals to low frequency signals for controlling devices of the remote control system. The ideal transmission distance of the 433 MHz low frequency signals can reach one to two kilometers, which is farther than that of WiFi signals or Bluetooth signals. Further the low frequency signals are less prone to be blocked by indoor partitions and cover a larger wireless transmission area, thereby solving disadvantages such as the shorter transmission distance inherent in WiFi signals or Bluetooth signals. The remote control system of the present invention can also automatically adjust parameters of the controlled device according to environmental conditions sensed by sensors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A remote control system having a communication frequency lower than wireless fidelity (WiFi) signals comprising:
    a control interface;
    a WiFi router linked to the control interface for bi-directionally communicating with the control interface via WiFi signals;
    a bridge linked to the WiFi router configured to down-convert WiFi signals outputted from the WiFi router to low frequency signals and up-convert the low frequency signals to the WiFi signals; and
    a first low frequency control module linked to the bridge for bi-directionally communicating with the bridge via the low frequency signals.

2. The remote control system of claim 1 further comprising:
    an access point linked to the first low frequency control module for bi-directionally communicating with the first low frequency control module via the low frequency signals.

3. The remote control system of claim 2 further comprising:
    a second low frequency control module linked to the access point for bi-directionally communicating with the access point via the low frequency signals.

4. The remote control system of claim 1 further comprising:
    a door lock system linked to the WiFi router for transmitting image signals to the WiFi router.

5. The remote control system of claim 1 further comprising:
    a switch linked to the first low frequency control module for bi-directionally communicating with the first low frequency control module via the low frequency signals.

6. The remote control system of claim 1 further comprising:
    a sensor linked to the first low frequency control module for generating a sensing signal according to environmental conditions and transmitting the sensing signal to the first low frequency control module for controlling the remote control system according to the sensing signal.

7. The remote control system of claim 1 wherein the first low frequency control module comprises an infrared emitter for emitting infrared signals.

8. The remote control system of claim 1 further comprising a power supply for supplying power to the remote control system.

9. The remote control system of claim 1 wherein the control interface is an interface of a portable mobile device or an interface of a computer.

10. The remote control system of claim 1 wherein the first low frequency control module is a bi-directional radio frequency (RF) control module utilizing frequency shift keying (FSK) modulation.

* * * * *